(12) United States Patent
Watanabe

(10) Patent No.: US 12,524,184 B2
(45) Date of Patent: Jan. 13, 2026

(54) INFORMATION PROCESSING APPARATUS, COMPUTER READABLE MEDIUM, AND SYSTEM REQUIRING COLLABORATION BETWEEN DIFFERENT ADMINISTRATORS WITHIN A PREDETERMINED TIME TO REGISTER TARGET APPARATUS ON A REGISTRATION SERVER

(71) Applicant: FUJIFILM Business Innovation Corp., Tokyo (JP)

(72) Inventor: Tsuyoshi Watanabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 341 days.

(21) Appl. No.: 18/179,422

(22) Filed: Mar. 7, 2023

(65) Prior Publication Data
US 2024/0053938 A1    Feb. 15, 2024

(30) Foreign Application Priority Data

Aug. 9, 2022   (JP) .................................. 2022-127235

(51) Int. Cl.
*G06F 3/12* (2006.01)
*H04N 1/00* (2006.01)

(52) U.S. Cl.
CPC .......... *G06F 3/1222* (2013.01); *G06F 3/1203* (2013.01); *G06F 3/1224* (2013.01);
(Continued)

(58) Field of Classification Search
CPC .... G06F 3/1203; G06F 3/1205; G06F 3/1222; G06F 3/1224; G06F 3/1236;
(Continued)

(56) References Cited

U.S. PATENT DOCUMENTS 8,599,414 B2 * 12/2013 Numata ................ G06F 3/1228
                                                          709/219
9,230,078 B2 *  1/2016 Hirata ..................... G06F 21/31
(Continued)

FOREIGN PATENT DOCUMENTS

JP    2021-184170 A    12/2021
JP    2022-025667 A     2/2022

*Primary Examiner* — Scott A Rogers
(74) *Attorney, Agent, or Firm* — Oliff PLC

(57) ABSTRACT

An information processing apparatus includes a processor configured to: receive a registration reservation with a registration server regarding a registration target apparatus that requires permission for registration on the registration server from a first administrator and a second administrator who is different from the first administrator, the registration reservation being based on an instruction from the first administrator who has permitted the registration of the registration target apparatus on the registration server; provide a reservation notification to the second administrator, the reservation notification indicating that the registration reservation has been received; and transmit, in response to a registration request from the second administrator who has received the reservation notification, a registration start instruction for starting registration processing to the registration target apparatus, the registration processing being processing for registering the registration target apparatus on the registration server and requiring permission from the second administrator within a predetermined time from start of the processing.

6 Claims, 6 Drawing Sheets

(52) U.S. Cl.
CPC .......... *G06F 3/1238* (2013.01); *G06F 3/1288* (2013.01); *G06F 3/1293* (2013.01); *H04N 1/00244* (2013.01); *H04N 1/00344* (2013.01); *H04N 2201/0094* (2013.01)

(58) Field of Classification Search
CPC ...... G06F 3/1237; G06F 3/1238; G06F 3/126; G06F 3/1261; G06F 3/1285; G06F 3/1286; G06F 3/1287; G06F 3/1288; G06F 3/1293; H04N 1/00127; H04N 1/00204; H04N 1/00244; H04N 1/00278; H04N 1/00344; H04N 1/00838; H04N 1/44; H04N 1/4406
See application file for complete search history.

(56) References Cited

U.S. PATENT DOCUMENTS

| | | | | |
|---|---|---|---|---|
| 11,392,330 | B2* | 7/2022 | Shiohara | G06F 3/1257 |
| 11,681,486 | B2* | 6/2023 | Yasuda | G06F 3/1204 |
| | | | | 358/1.15 |
| 11,868,668 | B2* | 1/2024 | Tjong | G06F 3/1261 |
| 11,979,541 | B2* | 5/2024 | Saito | H04N 1/4433 |
| 12,079,522 | B2* | 9/2024 | Shiohara | G06F 3/1224 |
| 12,147,717 | B2* | 11/2024 | Saito | G06F 3/1238 |
| 12,277,356 | B2* | 4/2025 | Ohara | G06F 3/1238 |
| 12,353,775 | B2* | 7/2025 | Furuta | G06F 3/1222 |
| 2022/0035581 | A1 | 2/2022 | Kawasaki | |
| 2023/0266934 | A1* | 8/2023 | Saito | G06F 3/1204 |
| 2024/0045624 | A1* | 2/2024 | Saito | G06F 3/1222 |
| 2024/0319928 | A1* | 9/2024 | Furuta | G06F 3/1238 |

* cited by examiner

FIG. 4

| APPARATUS NAME | APPARATUS ID | REGISTRATION READINESS |
|---|---|---|
| AAA BRANCH OFFICE BBB DEPARTMENT CCC DIVISION | a6dfc926-2504-4d68-88fc-3bb66b4ebc72 | ABLE TO BE REGISTERED |
| DDD PRINTER | 81d943db-5c86-4f1d-91d9-930495de6eac | UNABLE TO BE REGISTERED |
| EEE SALES OFFICE FFF GROUP | eae4594c-c563-4b12-9b36-30bd279d1aff | ABLE TO BE REGISTERED |
| ... | ... | ... |
| GGG PLANT HHH OFFICE (III MANAGEMENT) | 5c3e308c-d19d-4a24-b26a-916e7c59092f | ABLE TO BE REGISTERED |

INFORMATION PROCESSING APPARATUS, COMPUTER READABLE MEDIUM, AND SYSTEM REQUIRING COLLABORATION BETWEEN DIFFERENT ADMINISTRATORS WITHIN A PREDETERMINED TIME TO REGISTER TARGET APPARATUS ON A REGISTRATION SERVER

CROSS-REFERENCE TO RELATED APPLICATIONS

This application is based on and claims priority under 35 USC 119 from Japanese Patent Application No. 2022-127235 filed Aug. 9, 2022.

BACKGROUND

(i) Technical Field

The present disclosure relates to an information processing apparatus, a non-transitory computer readable medium, and an information processing system.

(ii) Related Art

A system that registers an apparatus on a registration server in advance so that a user is able to use the registered apparatus through the registration server has been suggested. For example, by registering an image forming apparatus on a print server as a registration server, in response to transmission of a printing instruction to the print server by the user, the printing instruction is transferred from the print server to the image forming apparatus. Thus, the user is able to cause the image forming apparatus to perform printing processing based on the printing instruction.

For example, in Japanese Unexamined Patent Application Publication No. 2022-25667, a system that registers a printer on a cloud server as a registration server is disclosed. In the case where a user who has administrator privileges for a printer permits registration of the printer on the basis of a registration request from a user who has only user privileges that are more limited than the administrator privileges, the system permits registration of the printer on the cloud server on the basis of the registration request from the user who only has the user privileges. In Japanese Unexamined Patent Application Publication No. 2021-184170, a system that registers an apparatus on a cloud server is disclosed. The system acquires a registration key for registration through an apparatus that has already been registered on the cloud server and registers a new apparatus on the cloud server by using the acquired registration key.

SUMMARY

A case where permission from a first administrator and permission from a second administrator who is different from the first administrator are required to register a registration target apparatus on a registration server may be considered. In this case, the registration target apparatus is not able to be registered on the registration server without collaboration between the first administrator and the second administrator (that is, unless both of them permit registration). Furthermore, a registration condition that, in order to register the registration target apparatus on the registration server, permission from the second administrator needs to be obtained within a predetermined time from the start of registration processing responding to permission from the first administrator may be imposed. The predetermined time is typically a short time, such as several minutes. Thus, in order to register the registration target apparatus on the registration server, close collaboration between the first administrator and the second administrator may be needed.

Aspects of non-limiting embodiments of the present disclosure relate to, in a case where, in order to register a registration target apparatus on a registration server, permission for registration from a second administrator needs to be obtained within a predetermined time from the start of registration processing responding to permission from a first administrator, allowing the second administrator to permit registration at a desired time after the first administrator permits registration.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receive a registration reservation with a registration server regarding a registration target apparatus that requires permission for registration on the registration server from a first administrator and a second administrator who is different from the first administrator, the registration reservation being based on an instruction from the first administrator who has permitted the registration of the registration target apparatus on the registration server; provide a reservation notification to the second administrator, the reservation notification indicating that the registration reservation has been received; and transmit, in response to a registration request from the second administrator who has received the reservation notification, a registration start instruction for starting registration processing to the registration target apparatus, the registration processing being processing for registering the registration target apparatus on the registration server and requiring permission from the second administrator within a predetermined time from start of the processing.

BRIEF DESCRIPTION OF THE DRAWINGS

Exemplary embodiments of the present disclosure will be described in detail based on the following figures, wherein:

FIG. 4 is a diagram illustrating an example of contents of a registration reservation table;

DETAILED DESCRIPTION

Figure 1:
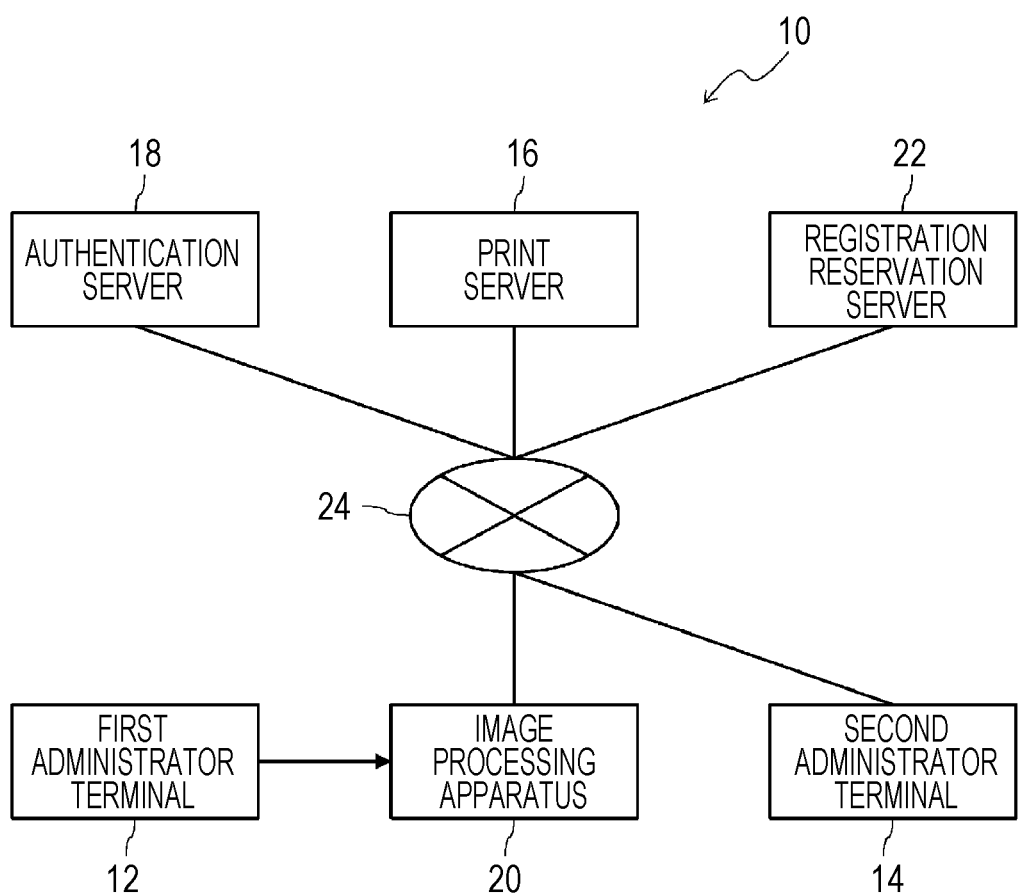
FIG. 1 is a schematic diagram of a configuration of an information processing system according to an exemplary embodiment.

FIG. 1 is a schematic diagram of a configuration of an information processing system 10 according to an exemplary embodiment. The information processing system 10 includes a first administrator terminal 12 that is used by a first administrator, a second administrator terminal 14 that is used by a second administrator who is different from the first administrator, a print server 16 that serves as a registration server and provides a cloud print service, an authentication server 18, an image processing apparatus 20 that serves as a registration target apparatus, and a registration reservation server 22 that serves as an information processing apparatus. The second administrator terminal 14, the print server 16, the authentication server 18, the image processing apparatus 20, and the registration reservation server 22 are connected to one another through a communication line 24 such as a local area network (LAN) or a wide area network (WAN) so that they are able to communicate with one another. Furthermore, the first administrator terminal 12 and the image processing apparatus 20 are connected to each other through short-range wireless communication so that they are able to communicate with each other. The first administrator terminal 12 may also be connected to the second administrator terminal 14, the print server 16, the authentication server 18, the image processing apparatus 20, and the registration reservation server 22 through the communication line 24 so that they are able to communicate with one another.

The information processing system 10 performs registration processing for registering the image processing apparatus 20, which is a registration target apparatus, on the print server 16, which is a registration server. By registering the image processing apparatus 20 on the print server 16, in response to transmission of a printing instruction (print job) to the print server 16 by a user, the user is able to cause the registered image processing apparatus 20 to perform printing processing based on the print job. The term "user" used herein represents a person who transmits a print job to the print server 16 in order that printing processing is performed by the registered image processing apparatus 20.

In the information processing system 10, permission from the first administrator and the second administrator is required to register the image processing apparatus 20 on the print server 16. More particularly, in the information processing system 10, the second administrator needs to permit registration of the image processing apparatus 20 on the print server 16 within a predetermined time from the time that the first administrator starts registration processing for registering the image processing apparatus 20 on the print server 16. In terms of security and the like, the predetermined time is set to a short time, for example, from ten to twenty minutes or a shorter time.

The registration target apparatus is not necessarily the image processing apparatus 20. The registration target apparatus may be any type of apparatus as long as registration conditions that, in order to register the registration target apparatus on the registration server, permission from both the first administrator and the second administrator is required and the second administrator needs to permit registration of the registration target apparatus on the registration server within a predetermined time from the time that the first administrator starts registration processing for registering the registration target apparatus on the registration server, are imposed.

In this exemplary embodiment, the first administrator is a person who manages the image processing apparatus 20 independently. For example, the first administrator is a member of staff at a place of business where the image processing apparatus 20 is installed. Furthermore, in this exemplary embodiment, the second administrator is an administrator of the cloud print service provided by the print server 16. In this exemplary embodiment, the first administrator has the privilege to change settings of the image processing apparatus 20 that they manage but does not have the privilege to register the image processing apparatus 20 on the print server 16. In contrast, the second administrator has the privilege to register the image processing apparatus 20 on the print server 16 but does not have the privilege to change settings of the image processing apparatus 20.

In the information processing system 10, to register the image processing apparatus 20 on the print server 16, settings of the image processing apparatus 20 need to be changed (for example, identification information of the image processing apparatus 20 is set in the print server 16). Thus, in this exemplary embodiment, to register the image processing apparatus 20 on the print server 16, permission from the first administrator (permission to change the settings of the image processing apparatus 20) and permission from the second administrator (permission to register the image processing apparatus 20 on the print server 16). Furthermore, in terms of security and the like, a registration condition that the second administrator needs to permit registration of the registration target apparatus on the registration server within a predetermined time from the time that the first administrator starts registration processing for registering the registration target apparatus on the registration server is imposed. The first administrator and the second administrator are not limited to those described above.

In order that the image processing apparatus 20 is able to be registered on the print server 16 without collaboration between the first administrator and the second administrator, the first administrator may be granted the privileges of the second administrator (in the example described above, the first administrator is granted the privilege to permit registration on the print server 16). However, this is not appropriate because the first administrator is granted the privilege to permit registration of an image processing apparatus 20 that is not managed by the first administrator on the print server 16. Meanwhile, the second administrator may be granted the privileges of the first administrator (in the example described above, the second administrator is granted the privilege to change settings of each of the image processing apparatuses 20). However, this is not appropriate because it is difficult for the second administrator who manages the cloud print service to understand the installation state or operating state of all the image processing apparatuses 20 and in such circumstances the settings of the image processing apparatus 20 may be configured inappropriately by the second administrator.

Each of the first administrator terminal 12 and the second administrator terminal 14 is, for example, a computer such as a personal computer, a tablet terminal, or a smartphone. Each of the first administrator terminal 12 and the second administrator terminal 14 includes a communication interface for communicating with other apparatuses through the communication line 24 or short-range wireless communication, an input interface for receiving an instruction from a user, a display on which various screens are displayed, a memory for storing data, a processor configured to execute various processes, and the like.

Each of the print server 16 and the authentication server 18 is, for example, a server computer. Each of the print server 16 and the authentication server 18 includes a communication interface for communicating with other apparatuses through the communication line 24, a memory for storing data, a processor configured to execute various processes, and the like.

As described above, the print server 16 is a server that provides the cloud print service to a user. When the image processing apparatus 20 is registered on the cloud print service by registration processing described later, the processor of the print server 16 causes an apparatus ID for uniquely identifying the image processing apparatus 20 to be stored into the memory of the print server 16. Then, when receiving a print job including the apparatus ID of an image processing apparatus 20 that the user wants to cause to perform printing processing from the user, the print server 16 transmits the print job to the image processing apparatus 20 represented by the apparatus ID. After that, by inputting a printing instruction to the image processing apparatus 20, the user is able to obtain a processing result of the print job. With the use of the cloud print service, the user is able to cause the image processing apparatus 20 to perform the printing processing without installing a driver for the image processing apparatus 20 into a user terminal that the user uses. Alternatively, with the use of the cloud print service, even if the user terminal that the user uses is not able to be connected to the LAN to which the image processing apparatus 20 is connected, by transmitting the print job to the print server 16 through the Internet or the like, the user is able to cause the image processing apparatus 20 to perform the printing processing.

The authentication server 18 is a server that performs processing for approving privileges. As described later, in this exemplary embodiment, in response to an instruction from the first administrator, the image processing apparatus 20 performs processing for registering on the print server 16 by using the privileges of the second administrator. At this time, the authentication server 18 is used. The print server 16 and the authentication server 18 may be integrated with each other. That is, the print server 16 may implement a function of the authentication server 18. The details of processing performed by the authentication server 18 will be described later.

Figure 2:
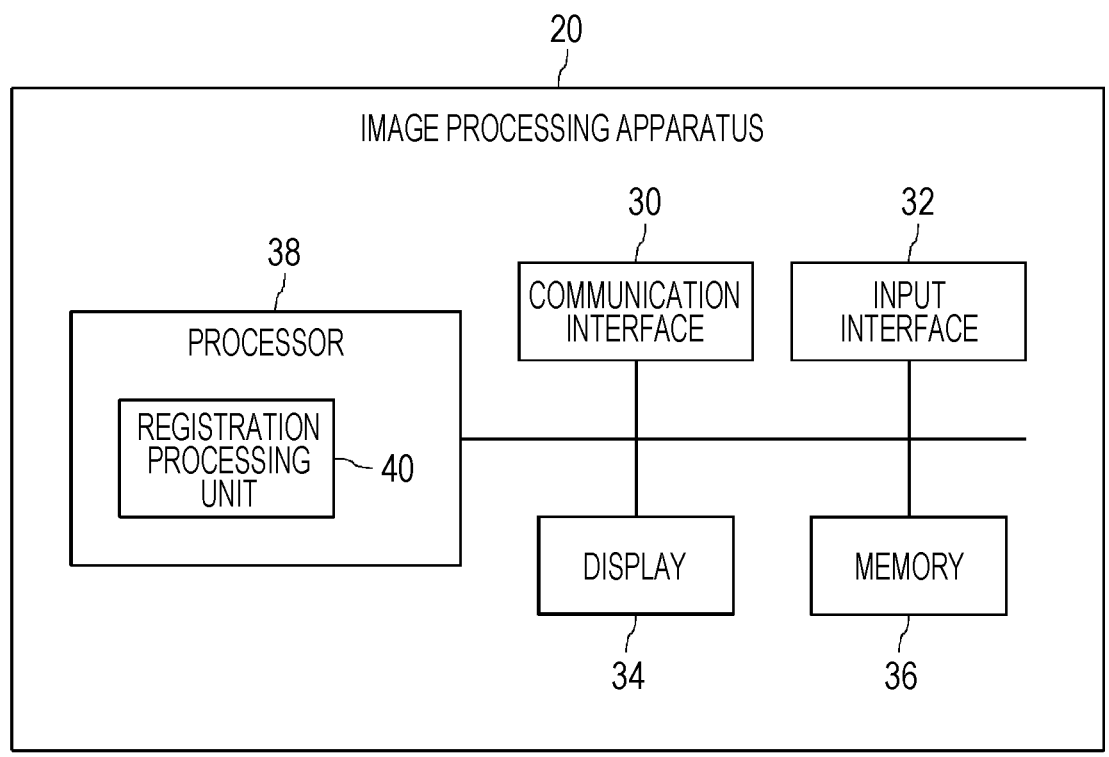
FIG. 2 is a schematic diagram of a configuration of an image processing apparatus.

FIG. 2 is a schematic diagram of a configuration of the image processing apparatus 20. The image processing apparatus 20 is a printer that has a printing function for printing an image on a printing medium such as paper. The image processing apparatus 20 may be a multifunction machine that has a scan function for optically reading an image from a printing medium, a copy function for printing a scanned image on a printing medium, a FAX function for transmitting an image to other apparatuses, and the like, in addition to the printing function.

A communication interface 30 includes a network interface card (NIC) or the like. The communication interface 30 implements a function for communicating with other apparatuses through the communication line 24. Alternatively, the communication interface 30 implements a function for communicating with the first administrator terminal 12 through short-range wireless communication.

An input interface 32 includes, for example, various buttons and a touch panel. The input interface 32 is used to input an instruction from a user or the first administrator to the image processing apparatus 20.

A display 34 includes, for example, a liquid crystal panel or an organic electroluminescence (EL) panel. Various screens are displayed on the display 34.

A memory 36 includes a hard disk drive (HDD), a solid state drive (SSD), an embedded multimedia card (eMMC), a read only memory (ROM), a random access memory (RAM), or the like. Data (device code described later or the like) necessary for registering on the print server 16 or data (print job or the like) necessary for printing processing is stored in the memory 36.

As illustrated in FIG. 2, a processor 38 that serves as a second processor implements a function of a registration processing unit 40.

The registration processing unit 40 performs, in response to an instruction from the first administrator, registration processing for registering the image processing apparatus 20 that includes the registration processing unit 40 on the print server 16. The details of the processing performed by the registration processing unit 40 will be described below with reference to flowcharts illustrated in FIGS. 5 and 6.

Figure 3:
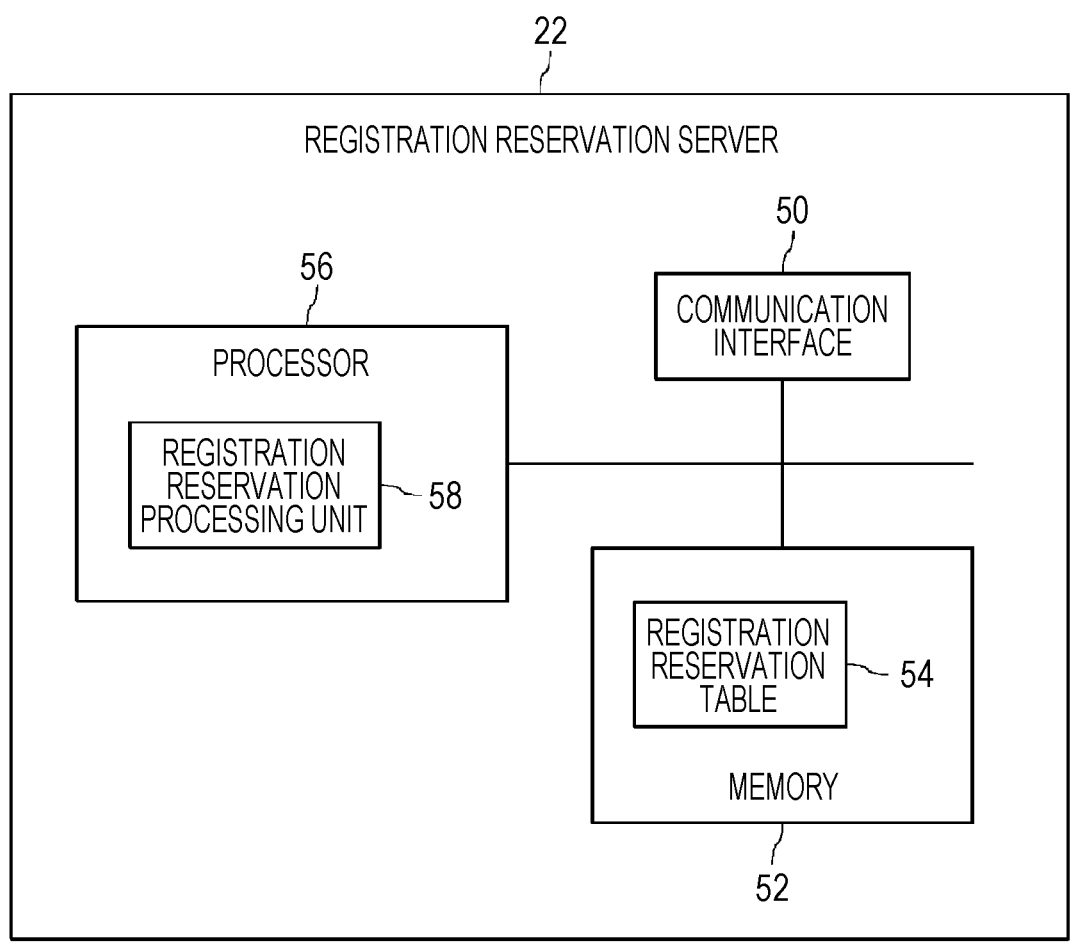
FIG. 3 is a schematic diagram of a configuration of a registration reservation server.

FIG. 3 is a schematic diagram of a configuration of the registration reservation server 22. The registration reservation server 22 is, for example, a server computer. The registration reservation server 22 is a server that provides a registration reservation service for making a reservation for registration processing for registering the image processing apparatus 20 on the print server 16 to the first administrator and the second administrator.

A communication interface 50 includes an NIC or the like. The communication interface 50 implements a function for communicating with other apparatuses through the communication line 24.

A memory 52 includes an HDD, an SSD, an eMMC, a ROM, a RAM, or the like. An information processing program for operating units of the registration reservation server 22 is stored in the memory 52. The information processing program may be stored in, for example, a computer-readable non-transitory recording medium such as a universal serial bus (USB) memory or a CD-ROM. The registration reservation server 22 may read the information processing program from the above-mentioned recording medium and execute the information processing program. Furthermore, as illustrated in FIG. 3, a registration reservation table 54 is stored in the memory 52.

Information indicating the image processing apparatus 20 that has been reserved to be registered on the print server 16 is stored in the registration reservation table 54. As described later, the first administrator is able to make a reservation for registration processing for registering the image processing apparatus 20 on the print server 16. Making a reservation for the registration processing is herein referred to as "registration reservation". Registration reservation is performed after the first administrator permits registration of the image processing apparatus 20 regarding the registration reservation on the print server 16. Obviously, the image processing apparatus 20 regarding the registration reservation is an image processing apparatus that has not yet been registered on the print server 16.

FIG. 4 is a diagram illustrating an example of contents of the registration reservation table 54. The apparatus name of an image processing apparatus 20 regarding registration reservation, an apparatus ID for uniquely identifying the image processing apparatus 20, and registration readiness information indicating whether or not the image processing apparatus 20 is in a state of being able to start registration processing are stored in association with one another in the registration reservation table 54. A method for storing information into the registration reservation table 54 and a method for using the registration reservation table 54 will be described later.

A processor 56 that serves as a first processor controls units of the registration reservation server 22. In particular, the processor 56 implements a function of a registration reservation processing unit 58 on the basis of the information processing program stored in the memory 52.

In response to an instruction from the first administrator, the registration reservation processing unit 58 performs reservation processing based on registration reservation. The details of processing performed by the registration reservation processing unit 58 will be described below with reference to the flowcharts illustrated in FIGS. 5 and 6.

Figure 5:
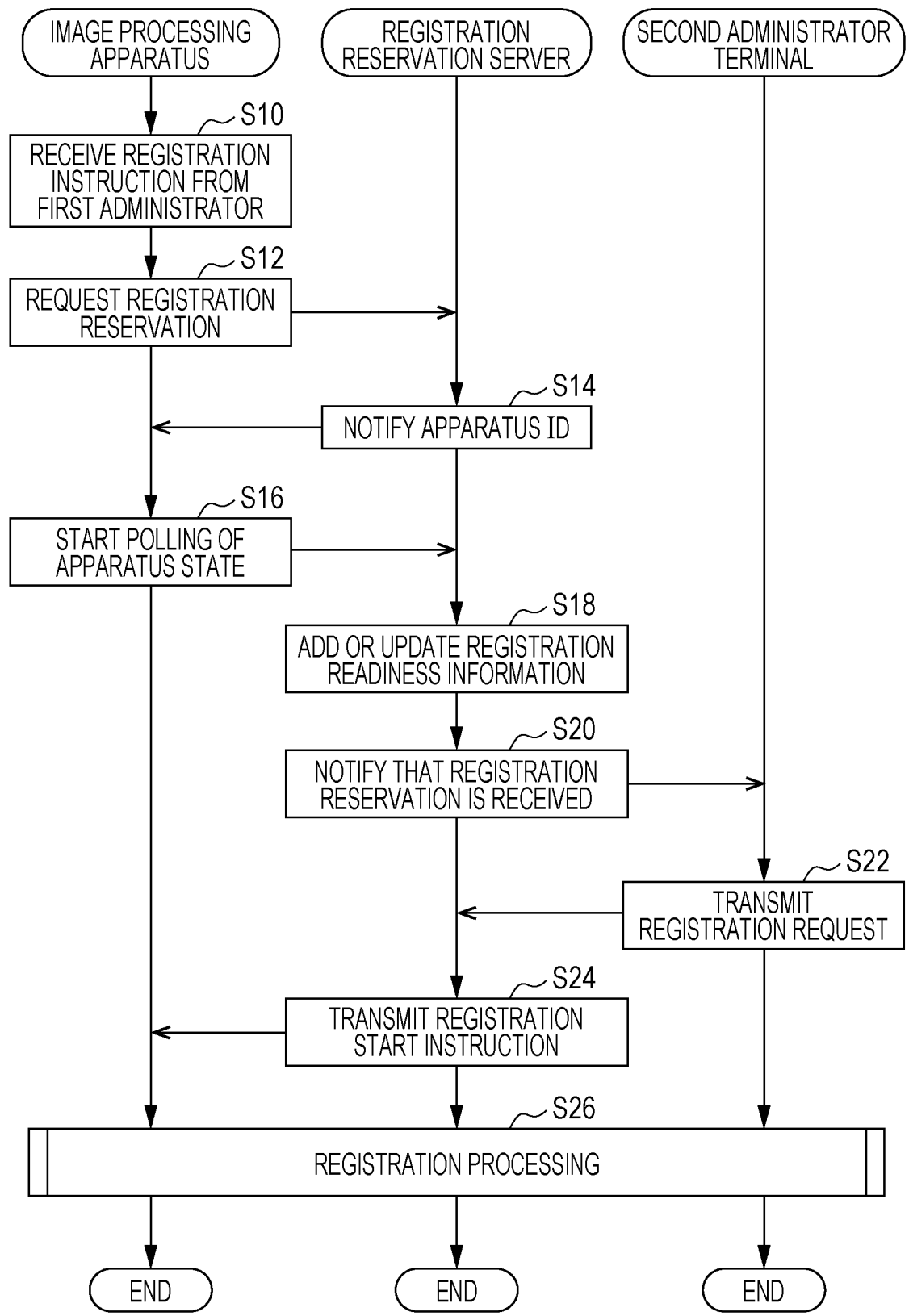
FIG. 5 is a flowchart illustrating the flow of a process performed by an information processing system according to an exemplary embodiment.
Figure 6:
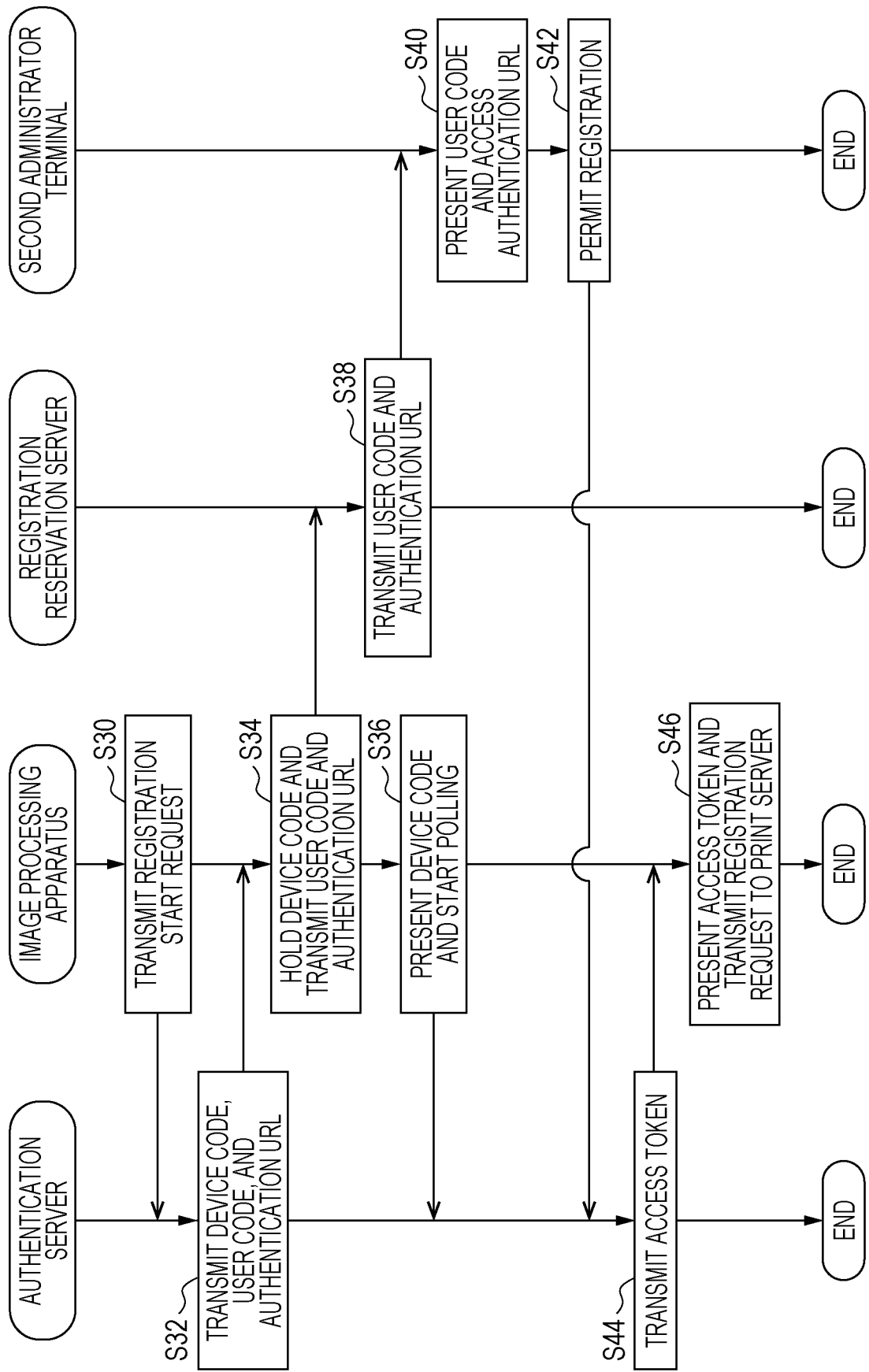
FIG. 6 is a flowchart illustrating the flow of a registration process.

Hereinafter, the details of a process performed by the registration processing unit 40 of the image processing apparatus 20, the details of a process performed by the registration reservation processing unit 58 of the registration reservation server 22, and the flow of a process of the information processing system 10 will be described below with reference to the flowcharts illustrated in FIGS. 5 and 6.

In step S10, the first administrator inputs a registration instruction for the print server 16 to the image processing apparatus 20. In other words, the image processing apparatus 20 receives the registration instruction for the print server 16 from the first administrator. It may be said that, by the time that the first administrator inputs the registration instruction to the image processing apparatus 20, the first administrator has permitted the image processing apparatus 20 to register on the print server 16.

For example, using the first administrator terminal 12, the first administrator may access the image processing apparatus 20 through short-range wireless communication to input a registration instruction to the image processing apparatus 20. Alternatively, the first administrator may operate the input interface 32 of the image processing apparatus 20 to input a registration instruction to the image processing apparatus 20.

In step S12, in response to the registration instruction from the first administrator, the registration processing unit 40 of the image processing apparatus 20 requests the registration reservation server 22 for registration reservation. In other words, the registration reservation server 22 receives from the image processing apparatus 20 a registration reservation based on the instruction from the first administrator. Specifically, the registration processing unit 40 transmits the apparatus name of the image processing apparatus 20 to the registration reservation server 22 and requests the registration reservation server 22 for registration reservation.

Preferably, to request the registration reservation, the registration processing unit 40 may notify the registration reservation server 22 of at least one of positional information indicating the position where the image processing apparatus 20 is installed and contact information of the first administrator. The positional information is stored in advance in the memory 36 of the image processing apparatus 20 by the first administrator or the like or may be acquired from a global positioning system (GPS) receiver provided at the image processing apparatus 20. The contact information of the first administrator is stored in advance in the memory 36 or input, along with the registration instruction, from the first administrator.

In step S14, when receiving the registration reservation from the image processing apparatus 20, the registration reservation processing unit 58 of the registration reservation server 22 acquires an apparatus ID for uniquely identifying the image processing apparatus 20 and stores the apparatus ID and the apparatus name received in step S12 in association with each other into the registration reservation table 54. Preferably, the registration reservation processing unit 58 associates the apparatus ID with at least one of the positional information of the image processing apparatus 20 and the contact information of the first administrator. Then, the registration reservation processing unit 58 notifies the image processing apparatus 20 of the apparatus ID.

In this exemplary embodiment, a request for registration reservation is transmitted from the image processing apparatus 20 to the registration reservation server 22. However, the request for registration reservation may be transmitted from the first administrator terminal 12 to the registration reservation server 22. In this case, the first administrator inputs the apparatus name of an image processing apparatus 20 that they want to register on the print server 16 to the first administrator terminal 12. The first administrator terminal 12 transmits the apparatus name to the registration reservation server 22 and then requests the registration reservation server 22 for registration reservation. The registration reservation server 22 receives the registration reservation and notifies the image processing apparatus 20 represented by the apparatus name of the apparatus ID.

In step S16, the registration processing unit 40 starts polling for periodically transmitting a combination of registration readiness information indicating whether or not the image processing apparatus 20 is in a state of being able to start registration processing for registering on the print server 16 and an apparatus ID to the registration reservation server 22.

Based on the state and settings of the image processing apparatus 20, the registration processing unit 40 determines whether or not the image processing apparatus 20 is in the state of being able to start the registration processing. For example, to perform the registration processing, the image processing apparatus 20 needs to be able to reliably communicate with the print server 16 through the communication line 24. Thus, for example, while network settings of the image processing apparatus 20 are being changed by the first administrator or the like, it is determined that the registration processing is not able to be started. The condition regarding whether or not the image processing apparatus 20 is able to start the registration processing may dynamically change. Thus, the registration processing unit 40 periodically transmits registration readiness information to the registration reservation server 22 by periodic polling. Polling is performed at very short time intervals, such as every several minutes.

By the polling described above, the registration reservation server 22 receives the combination of the apparatus ID and the registration readiness information from the image processing apparatus 20. Then, in step S18, the registration reservation processing unit 58 adds the received registration readiness information in association with the received apparatus ID into the registration reservation table 54. In the case where a new combination of the apparatus ID and registration readiness information is received in the state in which the registration readiness information corresponding to the apparatus ID has already been stored in the registration reservation table 54, the registration reservation processing unit 58 updates the registration readiness information corresponding to the apparatus ID in the registration reservation table 54. As described above, since polling is performed at very short time intervals, the registration readiness information stored in the registration reservation table 54 is updated in substantially real-time. The registration reservation processing unit 58 may acquire the registration readiness information of the image processing apparatus 20 by voluntarily making a query to the image processing apparatus 20 instead of polling from the image processing apparatus 20.

In step S20, the registration reservation processing unit 58 transmits to the second administrator a reservation notification indicating that the registration reservation from the first administrator has been received. In particular, the registration reservation processing unit 58 notifies the second administrator of the apparatus name of the image processing apparatus 20 regarding the registration reservation and the registration readiness information of the image processing apparatus 20, in addition to the reservation notification. In this exemplary embodiment, the registration reservation processing unit 58 transmits to the second administrator terminal 14 the uniform resource locator (URL) of a predetermined page of the registration reservation service in which the apparatus name and the registration readiness information of the image processing apparatus 20 are indicated, in addition to the reservation notification. The reservation notification may be transmitted to the second administrator in a different method.

In this exemplary embodiment, the registration reservation processing unit 58 transmits a reservation notification to the second administrator at the timing based on the point in time of reception of a request for registration reservation from the image processing apparatus 20 (immediately after reception of the request for registration reservation or a predetermined point in time after reception of the request for registration reservation). However, the registration reservation processing unit 58 may transmit a reservation notification to the second administrator, for example, in response to a query from the second administrator.

A destination for the notification to the second administrator (for example, information for identifying the second administrator terminal 14, an e-mail address of the second administrator, or the like) may be stored in advance in the memory 52 of the registration reservation server 22.

Preferably, the registration reservation processing unit 58 may transmit at least one of positional information indicating the position where the image processing apparatus 20 regarding the reservation notification is installed and contact information of the first administrator, along with the reservation notification, to the second administrator. For example, the above-mentioned information may also be indicated in the above-mentioned page of the registration reservation service.

In step S22, the second administrator accesses, using the second administrator terminal 14, the page of the registration reservation service indicated by the URL transmitted from the registration reservation server 22 and confirms the apparatus name and the registration readiness information of the image processing apparatus 20 for which the registration reservation has been made. The page includes a registration start button. When it is determined, based on the apparatus name and the registration readiness information of the image processing apparatus 20, that the image processing apparatus 20 is allowed to be registered on the print server 16, the second administrator operates the registration start button. The registration start button may be configured not to be able to be operated in the case where the registration readiness information represents that the image processing apparatus 20 is not able to be registered. Furthermore, in the case where the positional information of the image processing apparatus 20 is indicated in the page, the second administrator is able to determine, by also referring to the positional information of the image processing apparatus 20, whether or not the image processing apparatus 20 is to be registered on the print server 16. Furthermore, in the case where the contact information of the first administrator is indicated in the page, the second administrator is be able to contact the first administrator regarding the determination as to whether or not the image processing apparatus 20 is to be registered on the print server 16.

When the registration start button is operated by the second administrator, the registration reservation server 22 receives a registration request regarding the image processing apparatus 20 from the second administrator. Then, in step S24, the registration reservation processing unit 58 transmits a registration start instruction for starting the registration processing for registering the image processing apparatus 20 on the print server 16 to the image processing apparatus 20. As described above, in this exemplary embodiment, in the case where the image processing apparatus 20 is in a state of being unable to be registered (in a state of being unable to start the registration processing), the registration reservation processing unit 58 causes the registration start button in the page of the registration reservation service not to be operated. Thus, the second administrator is not able to transmit a registration request to the registration reservation server 22. Therefore, in the case where the image processing apparatus 20 is in the state of not being able to be registered, the registration reservation processing unit 58 does not transmit a registration start instruction to the image processing apparatus 20.

As described above, the registration processing requires permission from the second administrator within a predetermined time from the start of the processing. However, in this exemplary embodiment, the first administrator permits registration of the image processing apparatus 20 on the print server 16 and then makes a reservation with the registration reservation server 22 for registration processing. After that, in response to a registration request from the second administrator, the registration processing starts. That is, in this exemplary embodiment, after the first administrator permits registration, the second administrator is able to start registration processing at a desired timing.

When the registration reservation server 22 transmits a registration start instruction to the image processing apparatus 20, the registration processing unit 40 starts the registration processing for registering the image processing apparatus 20 on the print server 16 in step S26. In the registration processing, the registration processing unit 40 registers on the print server 16 after obtaining approval for privileges of the second administrator. Approval for privileges of the second administrator may be obtained using, for example, OAuth 2.0. The flow of registration processing will be described below with reference to FIG. 6.

In step S30, the registration processing unit 40 transmits a registration start request for starting the registration processing to the authentication server 18.

In step S32, in response to the registration start request, the authentication server 18 generates device code and user code that are codes to be used for authentication processing and an authentication page as an access destination for authentication. Then, the authentication server 18 transmits the device code, the user code, and an authentication URL as authentication access destination information indicating the address of the authentication page to the image processing apparatus 20. As described above, the registration processing requires permission from the second administrator within a predetermined time from the start of the processing. However, the start point of the predetermined time is the point in time when the authentication server 18 issues the device code, the user code, and the authentication URL. In other words, the device code, the user code, and the authentication URL expire when the predetermined time has passed since the issuance time.

In step S34, the registration processing unit 40 stores the received device code into the memory 36, and transfers the user code and the authentication URL to the registration reservation server 22.

In step S36, the registration processing unit 40 presents the device code and starts polling to the authentication server 18 for periodically making a query as to whether or not the second administrator has permitted registration in the authentication page indicated by the authentication URL corresponding to the device code. The polling is also performed at very short time intervals, such as every several minutes.

In step S38, the registration reservation processing unit 58 of the registration reservation server 22 notifies the second administrator of the received user code and the authentication URL. Here, the registration reservation processing unit 58 transfers the user code and the authentication URL to the second administrator terminal 14.

In step S40, the second administrator presents the user code and accesses the authentication page indicated by the authentication URL. To access the authentication page, the second administrator needs to present the user code. This prevents a person who does not have the user code from accessing the authentication page.

In step S42, the second administrator operates a registration permission button in the authentication page to permit registration of the image processing apparatus 20 on the print server 16. Access to the authentication page by the second administrator may be regarded as permission from the second administrator regarding registration of the image processing apparatus 20 on the print server 16. In this example, the second administrator permits registration within the predetermined time from the issuance of the device code, the user code, and the authentication URL by the authentication server 18.

In step S44, the authentication server 18 generates an access token in response to the registration permission from the second administrator. The access token is necessary for the image processing apparatus 20 to register on the print server 16. After generating the access token and then receiving polling from the registration processing unit 40, the authentication server 18 transmits the generated access token to the image processing apparatus 20.

If the second administrator permits registration after the predetermined time has passed since the issuance of the device code, the user code, and the authentication URL by the authentication server 18, the authentication server 18 does not generate the access token. In this case, the image processing apparatus 20 is not registered on the print server 16.

In step S46, the registration processing unit 40 presents the access token received from the authentication server 18 and transmits a registration request to the print server 16. Thus, the image processing apparatus 20 is registered on the print server 16. Specifically, the print server 16 stores identification information of the image processing apparatus 20 in the cloud print service into the memory of the print server 16. Furthermore, the registration processing unit 40 of the image processing apparatus 20 configures, based on the privileges of the first administrator, various settings necessary for registration of the image processing apparatus 20 on the print server 16.

Although exemplary embodiments of the present disclosure have been described above, the present disclosure is not limited to the exemplary embodiments described above. Various changes may be made without departing from the spirit of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

(Appendix)

(((1)))

An information processing apparatus comprising:
a processor configured to:
receive a registration reservation with a registration server regarding a registration target apparatus that requires permission for registration on the registration server from a first administrator and a second administrator who is different from the first administrator, the registration reservation being based on an instruction from the first administrator who has permitted the registration of the registration target apparatus on the registration server;
provide a reservation notification to the second administrator, the reservation notification indicating that the registration reservation has been received; and
transmit, in response to a registration request from the second administrator who has received the reservation notification, a registration start instruction for starting registration processing to the registration target apparatus, the registration processing being processing for registering the registration target apparatus on the registration server and requiring permission from the second administrator within a predetermined time from start of the processing.

(((2)))

The information processing apparatus according to (((1))), wherein the processor is configured to:
receive registration readiness information indicating whether or not the registration target apparatus is in a state of being able to start the registration processing from the registration target apparatus; and
in a case where the registration target apparatus is not in the state of being able to start the registration processing, not transmit the registration start instruction to the registration target apparatus.

(((3)))

The information processing apparatus according to (((1))), wherein the processor is configured to notify the second administrator of at least one of positional information indicating a position where the registration target apparatus is installed and contact information of the first administrator, along with the reservation notification.

(((4)))

An information processing program for causing a computer to execute a process comprising:
receiving a registration reservation with a registration server regarding a registration target apparatus that requires permission for registration on the registration server from a first administrator and a second administrator who is different from the first administrator, the registration reservation being based on an instruction from the first administrator who has permitted the registration of the registration target apparatus on the registration server;

providing a reservation notification to the second administrator, the reservation notification indicating that the registration reservation has been received; and transmitting, in response to a registration request from the second administrator who has received the reservation notification, a registration start instruction for starting registration processing to the registration target apparatus, the registration processing being processing for registering the registration target apparatus on the registration server and requiring permission from the second administrator within a predetermined time from start of the processing.

(((5)))

An information processing system comprising:

an information processing apparatus including a first processor; and a registration target apparatus including a second processor, wherein the first processor is configured to:

receive a registration reservation with a registration server regarding the registration target apparatus that requires permission for registration on the registration server from a first administrator and a second administrator who is different from the first administrator, the registration reservation being based on an instruction from the first administrator who has permitted the registration of the registration target apparatus on the registration server;

provide a reservation notification to the second administrator, the reservation notification indicating that the registration reservation has been received; and transmit, in response to a registration request from the second administrator who has received the reservation notification, a registration start instruction to the registration target apparatus, and wherein the second processor is configured to start, in response to the registration start instruction, registration processing that is processing for registering the registration target apparatus on the registration server, the registration processing requiring permission from the second administrator within a predetermined time from start of the processing.

(((6)))

The information processing system according to (((5))), wherein the second processor is configured to, as the registration processing:

transmit a registration start request to an authentication server and receive device code, user code, and authentication access destination information indicating an authentication access destination from the authentication server;

transmit the user code and the authentication access destination information to the second administrator;

after the second administrator permits the registration within the predetermined time from the start of the registration processing by presenting the user code and accessing the authentication access destination, receive an access token from the authentication server by presenting the device code and making a query to the authentication server; and present the access token and transmit a registration request to the registration server.

What is claimed is:

1. An information processing apparatus comprising:

a processor configured to:

receive a registration reservation with a registration server regarding a registration target apparatus that requires permission for registration on the registration server from a first administrator and a second administrator who is different from the first administrator, the registration reservation being based on an instruction from the first administrator who has permitted the registration of the registration target apparatus on the registration server;

provide a reservation notification to the second administrator, the reservation notification indicating that the registration reservation has been received; and transmit, in response to a registration request from the second administrator who has received the reservation notification, a registration start instruction for starting registration processing to the registration target apparatus, the registration processing being processing for registering the registration target apparatus on the registration server and requiring permission from the second administrator within a predetermined time from start of the processing.

2. The information processing apparatus according to claim 1, wherein the processor is configured to:

receive registration readiness information indicating whether or not the registration target apparatus is in a state of being able to start the registration processing from the registration target apparatus; and in a case where the registration target apparatus is not in the state of being able to start the registration processing, not transmit the registration start instruction to the registration target apparatus.

3. The information processing apparatus according to claim 1, wherein the processor is configured to notify the second administrator of at least one of positional information indicating a position where the registration target apparatus is installed and contact information of the first administrator, along with the reservation notification.

4. A non-transitory computer readable medium storing a program causing a computer to execute a process for information processing, the process comprising:

receiving a registration reservation with a registration server regarding a registration target apparatus that requires permission for registration on the registration server from a first administrator and a second administrator who is different from the first administrator, the registration reservation being based on an instruction from the first administrator who has permitted the registration of the registration target apparatus on the registration server;

providing a reservation notification to the second administrator, the reservation notification indicating that the registration reservation has been received; and transmitting, in response to a registration request from the second administrator who has received the reservation notification, a registration start instruction for starting registration processing to the registration target apparatus, the registration processing being processing for registering the registration target apparatus on the registration server and requiring permission from the second administrator within a predetermined time from start of the processing.

5. An information processing system comprising:
an information processing apparatus including a first processor; and
a registration target apparatus including a second processor,
wherein the first processor is configured to:
receive a registration reservation with a registration server regarding the registration target apparatus that requires permission for registration on the registration server from a first administrator and a second administrator who is different from the first administrator, the registration reservation being based on an instruction from the first administrator who has permitted the registration of the registration target apparatus on the registration server;
provide a reservation notification to the second administrator, the reservation notification indicating that the registration reservation has been received; and
transmit, in response to a registration request from the second administrator who has received the reservation notification, a registration start instruction to the registration target apparatus, and
wherein the second processor is configured to start, in response to the registration start instruction, registration processing that is processing for registering the registration target apparatus on the registration server, the registration processing requiring permission from the second administrator within a predetermined time from start of the processing.

6. The information processing system according to claim 5,
wherein the second processor is configured to, as the registration processing:
transmit a registration start request to an authentication server and receive device code, user code, and authentication access destination information indicating an authentication access destination from the authentication server;
transmit the user code and the authentication access destination information to the second administrator;
after the second administrator permits the registration within the predetermined time from the start of the registration processing by presenting the user code and accessing the authentication access destination, receive an access token from the authentication server by presenting the device code and making a query to the authentication server; and
present the access token and transmit a registration request to the registration server.

* * * * *